United States Patent
Cao et al.

(10) Patent No.: US 11,881,014 B2
(45) Date of Patent: Jan. 23, 2024

(54) INTELLIGENT IMAGE SENSING DEVICE FOR SENSING-COMPUTING-CLOUD INTEGRATION BASED ON FEDERATED LEARNING FRAMEWORK

(71) Applicant: Hebei University of Technology, Tianjin (CN)

(72) Inventors: Bin Cao, Tianjin (CN); Jianwei Zhao, Tianjin (CN); Xin Liu, Tianjin (CN); Hua He, Tianjin (CN); Yuchun Chang, Tianjin (CN); Yun Li, Tianjin (CN)

(73) Assignee: HEBEI UNIVERSITY OF TECHNOLOGY, Tianjin (CN)

( * ) Notice: Subject to any disclaimer, the term of this patent is extended or adjusted under 35 U.S.C. 154(b) by 0 days.

(21) Appl. No.: 18/155,461

(22) Filed: Jan. 17, 2023

(65) Prior Publication Data
US 2023/0360384 A1    Nov. 9, 2023

(30) Foreign Application Priority Data

May 5, 2022 (CN) .......................... 202210481409.4

(51) Int. Cl.
*G06N 3/08* (2023.01)
*G06V 10/82* (2022.01)
(Continued)

(52) U.S. Cl.
CPC ............. *G06V 10/82* (2022.01); *G06N 3/043* (2023.01); *G06N 3/082* (2013.01); *G06N 3/098* (2023.01)

(58) Field of Classification Search
CPC ........ G06V 10/82; G06N 3/043; G06N 3/082; G06N 3/098
(Continued)

(56) References Cited

U.S. PATENT DOCUMENTS 11,627,208 B2 *  4/2023  Li  ........................... H04L 67/12
                                                       709/223
2020/0336376 A1 * 10/2020  Mahdi  ...................... G06N 5/04
(Continued)

FOREIGN PATENT DOCUMENTS

| CN | 112949837 A | 6/2016 |
| CN | 113435604 A | 9/2021 |

(Continued)

OTHER PUBLICATIONS

Decision to Grant a Patent dated Jun. 21, 2023 issued in corresponding China Application No. 202210481409.4 (with English translation).
(Continued)

*Primary Examiner* — Charlotte M Baker
(74) *Attorney, Agent, or Firm* — Muncy, Geissler, Olds & Lowe, P.C.

(57) ABSTRACT

The present invention discloses an intelligent image sensing device for sensing-computing-cloud integration based on a federated learning framework. The device comprises: intelligent image sensors, edge servers and a remote cloud, wherein the intelligent image sensor is used for perceiving and generating images, and uploading the images to the edge server; the edge server is used as a client; the remote cloud is used as a server; the clients train a convolutional fuzzy rough neural network based on the received images and the proposed federated learning framework; and the intelligent image sensors download the weight parameters of the trained convolutional fuzzy rough neural network from the clients, and classify and recognize the images based on the trained weight parameters. The present invention searches a lightweight deep learning architecture through neuroevolution, and deploys the lightweight deep learning architecture
(Continued)

in the image sensors to automatically discriminate and analyze the perceived images.

3 Claims, 2 Drawing Sheets

(51) Int. Cl.
*G06N 3/082* (2023.01)
*G06N 3/098* (2023.01)
*G06N 3/043* (2023.01)

(58) Field of Classification Search
USPC .......................................................... 382/156
See application file for complete search history.

(56) References Cited

U.S. PATENT DOCUMENTS

2023/0019669 A1* 1/2023 Alabbasi ................ G06N 3/045
2023/0068386 A1* 3/2023 Akdeniz ................ G06N 3/063

FOREIGN PATENT DOCUMENTS

| CN | 113723619 A | 11/2021 |
| CN | 113850272 A | 12/2021 |
| CN | 114265913 A | 4/2022 |

OTHER PUBLICATIONS

Office Action dated May 29, 2023 issued in corresponding China Application No. 202210481409.4 (with English translation).

* cited by examiner

INTELLIGENT IMAGE SENSING DEVICE FOR SENSING-COMPUTING-CLOUD INTEGRATION BASED ON FEDERATED LEARNING FRAMEWORK

TECHNICAL FIELD

The present invention relates to the field of image sensors, and in particular to an intelligent image sensing device for sensing-computing-cloud integration based on a federated learning framework.

BACKGROUND

The data collected and processed by an image sensor have great application value and economic value. However, the risk of privacy disclosure exists in collecting and processing a large amount of image sensor data. Federated Learning (FL) is a reliable solution to privacy disclosure. FL can be used for multi-institutional collaboration to propagate only deep learning (DL) models, not monitoring data. Thus, isolated data islands are broken to realize indirect data sharing. Because of its privacy protection characteristic for image information, FL can be expanded to the field of environmental perception and monitoring of intelligent image sensors.

The DL models have been widely used in image learning. The DL models are conducive to accurately recognize targets for FL. Generally, the DL models have many parameters. If the DL models are frequently uploaded to a remote cloud server, the communication cost is high. Thus, many scholars have studied efficient FL frameworks.

Convolutional Neural Network (CNN) has been successfully applied in the field of image recognition, and has excellent performance. However, its disadvantage is that deep CNN is regarded as a black box and lacks interpretability. Although interpretability has been studied by scholars, such as design of special loss items and supply of heat maps to facilitate decision making, there is little literature that combines interpretability and FL. In addition, a neural network architecture is manually set, and cannot satisfy multiple needs in practical application.

SUMMARY

The present invention provides an intelligent image sensing device for sensing-computing-cloud integration based on a federated learning framework. In order to improve the intelligence of the image sensor, the present invention proposes an adaptive federated learning framework and efficiently learns the data collected by the image sensor. A lightweight deep learning architecture is searched through neuroevolution, and deployed in the image sensor to automatically discriminate and analyze the perceived images. Details are provided in the description below:

An intelligent image sensing device for sensing-computing-cloud integration based on a federated learning framework is provided. The device comprises: intelligent image sensors, edge servers and a remote cloud.

Wherein the intelligent image sensor is used for perceiving and generating images, and uploading the images to the edge server; the edge server is used as the client; and the remote cloud is used as a server.

The client trains a convolutional fuzzy rough neural network based on the received images and the proposed federated learning framework; and the intelligent image sensor downloads the weight parameters of the trained convolutional fuzzy rough neural network from the client, and classifies and recognizes the images based on the trained weight parameters.

Wherein the federated learning framework is:
1) the training improvement frequency, stagnation frequency or accuracy increase degree of each client is checked every certain number of epochs; and if any of the three conditions reaches a corresponding threshold, the current client is used as a candidate client;
2) after all clients are checked, if the number of the candidate clients is higher than half of the total number of the clients, the training information of the candidate clients is updated;
3) the candidate clients upload the weight parameters of a DL model to the server, and the server aggregates the weight parameters and sends the aggregated weight parameters back to all the candidate clients;
4) steps 1) to 3) are repeated until the predefined number of training epochs is reached, and the process is ended.

Further, the convolutional fuzzy rough neural network is:
An expansion layer is replaced by a fuzzification layer, and the next three layers are a fuzzy rule layer, a rough layer and an output layer.

In the fuzzification layer, two membership functions are used for transforming each feature value into two membership degrees, so that the number of channels is doubled.

Each feature map is reduced to a single value by using global pooling, which is regarded as the fuzzy rule layer; and the membership degree of the same map is averaged to obtain the activation intensity of fuzzy rules.

The rough layer uses a plurality of 1×1 filters to mix input features; and a filtering weight is a rough membership degree. Because the membership degree is a positive value from 0 to 1, the filtering weight is an absolute value.

A classifier layer is used as an output layer, wherein the absolute value of the connection weight is used, and the bias unit is eliminated.

Wherein the convolutional fuzzy rough neural network has no consequence layer, or the output of a consequence node is 1.

The sensing device further comprises: the parameters of the convolutional fuzzy rough neural network are initialized, specifically:

Parameters α of the two membership functions are initialized to 1 and −1 respectively; the value of the parameter σ is 1; α is an expected value, and σ is a standard deviation;

If the random assignment of the expected value a and the standard deviation σ is within the range of [−1,1] or close to the range, MFs have high membership degree of the random assignment of [−1,1]; and the smaller the expected value σ is, the more likely the smaller the output value is, the more difficult it is to train and optimize.

The technical solution provided by the present invention has the beneficial effects that:
1. The present invention effectively reduces the communication cost of federated learning;
2. The present invention improves the interpretability of the deep learning model;
3. A lightweight deep learning neural network architecture applicable to image sensors is obtained through neuroevolution.

DETAILED DESCRIPTION

To make the purpose, the technical solution and the advantages of the present invention more clear, embodiments of the present invention are further described in detail below.

In order to solve the problems in the background, the following technology is also studied in embodiments of the present invention:

Fuzzy theory emphasizes the fuzziness of knowledge in an information system. Rough set theory emphasizes the indistinguishability of knowledge in the information system, and is used for processing all kinds of incomplete information, such as uncertainty and incompleteness, and finding hidden rules from the information. Fuzzy rough theory can process complex data and generate explainable knowledge. Fuzzy Rough Neural Network (FRNN) can be built and optimized through Evolutionary Algorithms (EAs) to solve complex problems in the real world.

Neuroevolution, or evolution-based neural architecture search can automatically search the best network architecture and hyperparameters. This can be used in FL environments, and multiobjective optimization is achieved while considering network performance and complexity. Moreover, the optimization efficiency can be greatly increased by inheriting the weight parameters from a supernetwork.

Figure 1:
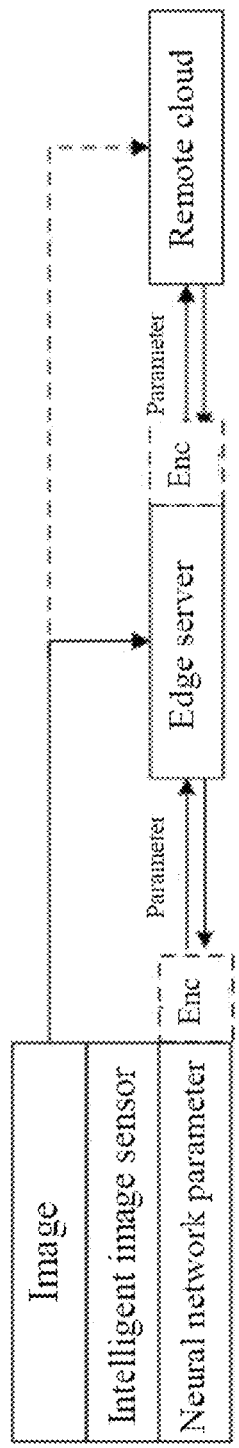
FIG. 1 is a structural schematic diagram of an intelligent image sensing device for sensing-computing-cloud integration based on a federated learning framework.

An intelligent image sensing device for sensing-computing-cloud integration based on a federated learning framework, as shown in FIG. 1, comprises: intelligent image sensors, edge servers and a remote cloud.

Wherein the intelligent image sensor is used for perceiving and generating images, and uploading the images to the edge server; the edge server is used as the client; the remote cloud is used as a server; and the edge servers and the cloud server train a Convolutional Fuzzy Rough Neural Network (CFRNN) based on the received images and the proposed federated learning framework. After the training is completed, the intelligent image sensor downloads the trained weight from the edge server and conducts the tasks of image classification and recognition independently.

Further, to reduce the communication burden of uploading and downloading DL model parameters in FL, a simple method is to exchange information after a predefined number of epochs, rather than to exchange information after each epoch. To further increase the efficiency, the client becomes a candidate for uploading of the DL model if the frequency of increasing accuracy, increased accuracy, or frequency of stagnation reaches a predefined threshold. If more than half of the clients become candidate clients, a central server notifies the candidate clients to upload local model parameters and send the aggregated DL model back to the candidate clients.

Wherein the number of the above epochs is set according to the needs of practical application, and is not limited in the embodiments of the present invention.

1. Federated Learning Framework

---

Algorithm 1: Adaptive Federated Learning

Input: epoch number: $N_{epoch}$, epoch threshold; $N_{epoch}^{th}$, improvement count threshold; $N_{imp}^{th}$, stagnation count threshold; $N_{stag}^{th}$, stagnation value threshold; $v_{stag}^{th}$, accuracy ratio threshold: $r_{imp}^{th}$, ideal accuracy; $v_{acc}^{idl} = 1.0$.

Output: final model weight: $w_{final}^g$.

1 The server builds the DL model;
2 The server initializes the model weights to $w^g$;
3 The server scatters the model to clients;
4 for $k \in \{1, 2, \ldots, K\}$ do
5   | $N_{comm}^k = 0$;
6   | $v_{ba}^k = 0$;
7   | $v_{cba}^k = 0$;
8   | $N_{imp}^k = 0$;
9   ⌊ $N_{stag}^k = 0$;
10 for $i \in \{1, 2, \ldots, N_{epoch}\}$ do
11   | Clients train the local models;
13   | Update $v_{cba}^k$ and $N_{imp}^k$ if the training accuracy is improved;
14   | if $i \% N_{epoch}^{th} = 0$ then
15   |   | if $i = N_{epoch}^{th}$ then
16   |   |   | All clients are candidates for model uploading and updating;
17   |   | else
18   |   |   | if $N_{imp}^k \geq N_{imp}^{th}$ or $N_{stag}^k \geq N_{stag}^{th}$ or $v_{cba}^k - v_{ba}^k \geq r_{imp}^{th} (v_{cba}^k - v_{ba}^k)$ then
19   |   |   |   | Client k becomes a candidate for updating;
20   |   | if The number of candidates is above $K/2$ then
21   |   |   | Update $v_{ba}^k$, $N_{imp}^k$, and $N_{comm}^k$;
22   |   |   | Candidate clients upload model weights;
23   |   |   | The server validate the received model weights;
24   |   |   | The server aggregate the model weights based on the training data sizes;
25   |   |   ⌊ Scatter the updated ist to the candidate clients;

26 $w_{final}^g = w^g$;

The proposed federated learning framework is specifically as follows:

Whether the training accuracy is improved or stagnated is recorded after training for one epoch; the training improvement frequency, stagnation frequency or accuracy increase degree of each client is checked every certain number of epochs; and if any of the three reaches a corresponding threshold, the current client is marked as a candidate client; after all clients are checked, if the number of the candidate clients is higher than half of the total number of the clients, the training information of the candidate clients is updated (for example, the current accuracy is set as the latest accuracy, and the accuracy increase frequency and the stagnation frequency are set as 0); the weight parameters of the DL model are uploaded to the server; and the server sends the updated weight parameters of the DL model back to the candidate clients after aggregation. This process continues until the predefined number of training epochs is exhausted.

Wherein the above thresholds are set according to the needs of practical application, and are not limited in the embodiments of the present invention.

2. Convolutional Fuzzy Rough Neural Network (CFRNN)

Figure 2:
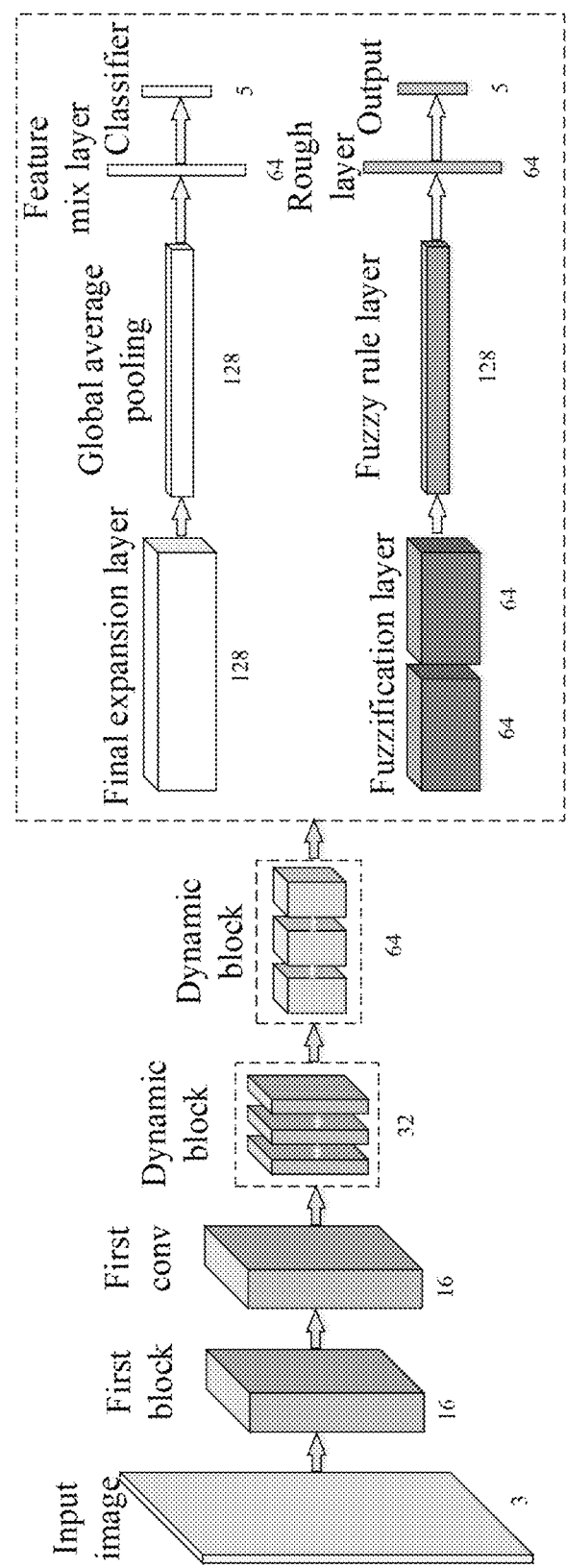
FIG. 2 is a schematic diagram of a third-generation mobile network (MobileNetV3) of two dynamic blocks and a proposed CFRNN.

Backbone CNN is an improved MobileNetV3, which is a lightweight deep neural network including 2 dynamic blocks, has reduced complexity and is suitable for mobile devices and the Internet of Things. In FIG. 2, two blocks of MobileNetV3 and the proposed CFRNN are shown. By comparing the two architectures, it can be seen that in the CFRNN, the final expansion layer is replaced by the fuzzification layer, and the following layers can be regarded as the fuzzy rule layer, the rough layer, and the output layer. The differences can be summarized as follows:

In the initial final expansion layer, input feature maps are expanded to more channels through a series of 1×1 filters:

$$O_{c,h,w}^{FEL} = \sigma^{FEL}\left(\sum_{i=1}^{c_{In}^{FEL}} w_{c,i}^{FEL} I_{i,h,w}^{FEL}\right) \quad (1)$$

$$s.t. \begin{cases} c = 1, 2, \ldots, c_{Out}^{FEL} \\ h = 1, 2, \ldots, h_{In}^{FEL} \\ w = 1, 2, \ldots, w_{In}^{FEL} \end{cases} \quad (2)$$

$$\sigma^{FEL}(x) = x \frac{\min(\max(0, x+3), 6)}{6} \quad (3)$$

Wherein $O^{FEL}$ represents the output of the final expansion layer; $\sigma^{FEL}$ represents an activation function; c represents a channel; h (w) represents the height (width) of the feature map; $c_{In}^{FEL}$ represents the number of input feature map channels of the final expansion layer; $w^{FEL}$ represents the weight of the filter; $I^{FEL}$ represents the input feature map; $c_{Out}^{FEL}$ represents the number of channels of output feature maps of the final expansion layer; and $h_{In}^{FEL}$ ($w_{In}^{FEL}$) represents the height (width) of the input feature maps.

In the fuzzification layer, two membership functions (MF) are used for transforming each input feature value into two membership degrees, so that the number of channels is doubled. Here, Gaussian MF is used:

$$f^{MF}(u) = e^{-\frac{(u-\alpha)^2}{2\sigma^2}} \quad (4)$$

Wherein $f^{MF}$ represents MF; u represents input; and α and σ represent parameters. In FIG. 3, there are 64 input feature maps. Two groups of membership degree maps can be obtained by fuzzification, and each group of membership degree maps has 64 channels.

By replacing the final expansion layer with the fuzzification layer, the number of parameters is reduced from 128×64 to 2×2, thereby greatly reducing the complexity. In the two blocks of MobileNetV3, each feature map is reduced to a single value by global pooling, which can be regarded as the fuzzy rule layer in the CFRNN. The membership degree of the same map is averaged to obtain the activation intensity of fuzzy rules.

A feature mix layer uses a plurality of 1×1 filters to mix the input features. In the CFRNN, this layer can be regarded as a rough layer, and the filtering weight is a rough membership degree. Since the rough membership degree is between [0,1], the absolute value of the filtering weight is used.

Finally, the classifier layer is a fully connected layer, and the number of output nodes is equal to the number of classes to be classified. In the CFRNN, this is an output layer, and similar to the rough layer, this layer uses the absolute value of the connection weight. In addition, the bias unit is eliminated. For simplicity, unlike FRNN, this layer has no consequence layer, or the outputs of the consequence nodes are all a fixed value of 1.

In the fuzzification layer, Gaussian membership functions (MFs) are used for transforming the input feature maps. Because the operation of Gaussian MFs is different from that of the convolutional layer and the fully connected layer, the traditional initialization method is not suitable. Therefore, embodiments of the present invention propose a hand-designed initialization solution, as follows:

Parameter α: because batch standardization is used in the previous layer, the values in the input feature maps are approximately [−1,1]. To associate pixels having high membership values and high absolute activation values, parameters α in the two Gaussian MFs are initialized to 1 and −1, respectively.

Parameter σ: because the values of the input feature maps are between [−1,1], the scale parameter σ is simply initialized to 1 in order to make the output value neither too small nor too large to facilitate training.

On the contrary, if the initial values of the expected value α and the standard deviation σ is randomly assigned in the range of [−1,1] or close to the range, MFs have high membership degree for the initial assignment value in [−1, 1]; and the smaller the standard deviation σ is, the more likely the smaller the output value is, which is difficult to optimize. This will reduce the interpretability of the network, greatly reduce the convergence rate of the network, and make the network fall into poor local optimal with low accuracy.

3. Neuroevolution

Based on the CFRNN supernetwork proposed above, embodiments of the present invention design a flexible search space as follows:

1) The activation function types in the dynamic blocks are optimized, and there are six types.

2) The base stage widths are regarded as variables and optimized.

Table 1 list all hyperparameters considered in the search space.

TABLE 1

Parameter Setting

| Symbol | Meaning | Value |
|---|---|---|
| $L_{kn}$ | Kernel size | {3, 5, 7} |
| $R_{xp}$ | Expansion rate | {1, 2, 3} |
| $D_b$ | Block depth | {1, 2, 3} |
| $S_{in}$ | Size of input images | {128, 132, 136, . . . , 256} |
| $T_{act}$ | Activation function type | {relu, relu6, tanh, sigmoid, h_swish, h_sigmoid} |
| $W_{bs}$ | Base stage width | {8, 16} {8, 24, 32} {16, 24, 32, 48, 64} {8, 16, 32, 64} |

During neuroevolution, the accuracy of the network is often more important than the complexity. However, in MOEAs, different objectives are treated equally. Thus, in neuroevolution based on multiobjective evolutionary algorithm (MOEA), the objectives of accuracy and complexity are simultaneously optimized without emphasis. In view of this problem, in combination with MOEA and evolutionary algorithm (EA), i.e., NSGA-II and genetic algorithm (GA), embodiments of the present invention propose a memetic algorithm. MOEA optimizes both the two objectives, while EA focuses on improving the accuracy. Corresponding to MOEA and EA, there are two archives. One saves nondominated solutions, and the other records solutions with high accuracy. The details are as follows:

---

Algorithm 2: Memetic NSGA-II for Neuroevolution

Input: population size: P, generation number: $N_{GEN}$.
Output: final population: $S_{final}^{pop}$.
1  Initialize population $S_0^{pop}$;
2  Initialize the archive for NSGA-II: $S_M^{arc} = S_0^{pop}$;
3  Intialize the archive for GA: $S_S^{arc} = S_0^{pop}$;
4  for $g \in \{1, 2, \ldots, N_{GEN}\}$ do
5  | Generate P/2 offspring via NSGA-II based on $S_M^{arc}$;
6  | Generate P/2 offspring via GA based on $S_S^{arc}$;
7  | Obtain the combined offspring population $S_g^{off}$;
8  | Combine $S_M^{arc}$ and $S_g^{off}$ and generate the updated $S_M^{arc}$ via
   | nondominated sorting and crowding distance;
9  | Combine $S_S^{arc}$ and $S_g^{off}$ and generate the updated $S_S^{arc}$
   | based on accuracy;
10 $S_{final}^{pop} = S_M^{arc} \cup S_S^{arc}$;

---

Firstly, the population is initialized, which is directly used as the archives of NSGA-II and GA. In each generation of evolution, half of the offspring is generated based on NSGA-II and the archive, and the other half of the offspring is generated based on GA and the archive. All offspring constitute the offspring population. Considering the offspring population and the archive of NSGA-II comprehensively, the archive of NSGA-II is updated and generated based on nondominanted sorting and crowding distance. Considering the offspring population and the archive of GA comprehensively, the archive of GA is updated and generated based on the accuracy. Finally, the evolution is repeated until the predefined number of generations is reached, and the archives of NSGA-II and GA are combined as a final population.

The feasibility of the above image sensing device is verified below in combination with specific experimental data:

TABLE 2

Parameter Setting for Adaptive Federated Learning

| Symbol | Meaning | Value |
|---|---|---|
| $N_{epoch}$ | Number of Epochs | 200 or 5 |
| $N_{epoch}^{th}$ | Epoch threshold | 10 or 1 |
| $N_{imp}^{th}$ | Improvement frequency threshold | 10 or 2 |
| $N_{stag}^{th}$ | Stagnation frequency threshold | 20 or 2 |
| $v_{stag}^{th}$ | Stagnation value threshold | 0.001% |
| $r_{imp}^{th}$ | Accuracy threshold | 0.1 |
| $v_{acc}^{idl}$ | Ideal accuracy | 1 |

Table 2 can be referred to in the above parameter setting for adaptive federated learning, wherein the first four symbols correspond to two values; the former value is used for training the supernetwork, and the latter value is used for neuroevolution. After the edge server collects enough images, the supernetwork is trained based on the adaptive federated learning framework. The remote cloud is used as a server and edge servers are used as clients to train the proposed CFRNN supernetwork.

In an adaptive federated environment, neural architectures with high accuracy and simple structure are searched based on the trained supernetwork and according to the subnet sampling of the proposed memetic NSGA-II neuroevolution algorithm.

Expected effects: compared with static federated learning, the adaptive federated learning framework can approximately reduce the communication cost by 35%-50%, and has little loss of accuracy. Neuroevolution can sample CFRNN neural architectures with satisfactory accuracy and significantly low FLOPs.

The embodiments of the present invention do not limit the models of other devices unless otherwise specified, as long as the devices can complete the above functions.

Technical personnel in this field can understand that the drawings are only schematic diagrams of a preferred embodiment, and the serial numbers of the embodiments of the present invention are only for explanation and do not represent the superiority or inferiority of the embodiments.

The above only describes preferred embodiments of the present invention and is not intended to limit the present invention. Any modification, equivalent replacement, improvement, etc. made within the spirit and the principle of the present invention shall be included within the protection scope of the present invention.

The invention claimed is:

1. An intelligent image sensing device for sensing-computing-cloud integration based on a federated learning framework, comprising: intelligent image sensors, edge servers and a remote cloud;
   wherein the intelligent image sensor is used for perceiving and generating images, and uploading the images to the edge server; the edge server is used as a client; and the remote cloud is used as a server;
   the client trains a convolutional fuzzy rough neural network based on the received images and the proposed federated learning framework; and the intelligent image sensor downloads the weight parameters of the trained convolutional fuzzy rough neural network from the client, and classifies and recognizes the images based on the trained weight parameters;

wherein the federated learning framework is:
1) the training improvement frequency, stagnation frequency or accuracy increase degree of each client is checked every certain number of epochs; and if any of the three conditions reaches a corresponding threshold, the current client is used as a candidate client;
2) after all clients are checked, if the number of the candidate clients is higher than half of the total number of the clients, the training information of the candidate clients is updated;
3) the candidate clients upload the weight parameters of a deep learning (DL) model to the server, and the server aggregates the weight parameters and sends the aggregated weight parameters back to all the candidate clients;
4) steps 1) to 3) are repeated until the predefined number of training epochs is reached, and the process is ended;
wherein the convolutional fuzzy rough neural network is:
an expansion layer is replaced by a fuzzification layer, and the next three layers are a fuzzy rule layer, a rough layer and an output layer;
in the fuzzification layer, two membership functions are used for transforming each feature value into two membership degrees, so that the number of channels is doubled;
each feature map is reduced to a single value by using global pooling, which is regarded as the fuzzy rule layer; and the membership degree of the same map is averaged to obtain the activation intensity of fuzzy rules;
the rough layer uses a plurality of 1×1 filters to mix input features; a filtering weight is a rough membership degree; because the membership degree is a positive value from 0 to 1, the filtering weight is an absolute value;
a classifier layer is used as an output layer, wherein the absolute value of the connection weight is used, and the bias unit is eliminated.

2. The intelligent image sensing device for sensing-computing-cloud integration based on the federated learning framework according to claim 1, wherein the convolutional fuzzy rough neural network has no result layer, or the output of a result node is 1.

3. The intelligent image sensing device for sensing-computing-cloud integration based on the federated learning framework according to claim 1, wherein the sensing device further comprises: the parameters of the convolutional fuzzy rough neural network are initialized, specifically:
parameters $\alpha$ of the two membership functions are initialized to 1 and −1 respectively; the value of the parameter $\sigma$ is 1; $\alpha$ is an expected value, and $\sigma$ is a standard deviation;
if the random assignment of the expected value $\alpha$ and the standard deviation $\sigma$ is within the range of [−1,1] or close to the range, MFs have high membership degree of the random assignment of [−1,1]; and the smaller the standard deviation $\sigma$ is, the more likely the smaller the output value is.

* * * * *